United States Patent
Buck

(10) Patent No.: US 6,859,017 B2
(45) Date of Patent: Feb. 22, 2005

(54) METHOD FOR GENERATING A SETPOINT CURRENT VALUE FOR A LOAD-DEPENDENT CURRENT-GENERATING SYSTEM

(75) Inventor: Michael Buck, Calw (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/125,569

(22) Filed: Apr. 19, 2002

(65) Prior Publication Data

US 2002/0163320 A1 Nov. 7, 2002

(30) Foreign Application Priority Data

Apr. 21, 2001 (DE) .......................................... 101 19 726

(51) Int. Cl.$^7$ ........................... H02H 7/06; H02P 11/00; H02P 9/00
(52) U.S. Cl. ...................................................... 322/27
(58) Field of Search .................... 322/27, 46; 318/139, 318/471; 429/23, 24, 73, 79, 22

(56) References Cited

U.S. PATENT DOCUMENTS

| | | | | | |
|---|---|---|---|---|---|
| 4,642,273 A | * | 2/1987 | Sasaki | ........................... | 429/22 |
| 4,821,190 A | * | 4/1989 | Patil | ............................. | 701/68 |
| 5,569,994 A | * | 10/1996 | Taylor et al. | ................ | 318/700 |
| 5,627,752 A | * | 5/1997 | Buck et al. | ..................... | 701/35 |
| 5,637,414 A | * | 6/1997 | Inoue et al. | ................... | 429/13 |
| 5,646,852 A | * | 7/1997 | Lorenz et al. | ............... | 701/103 |
| 5,780,981 A | * | 7/1998 | Sonntag et al. | .............. | 318/139 |
| 5,877,600 A | * | 3/1999 | Sonntag | ....................... | 318/139 |
| 6,180,271 B1 | * | 1/2001 | Stuhler et al. | ................ | 429/13 |
| 6,222,362 B1 | * | 4/2001 | Schulter et al. | ......... | 324/207.25 |
| 6,238,817 B1 | * | 5/2001 | Reiser | ........................... | 429/34 |
| 6,424,110 B1 | * | 7/2002 | Daly | ............................ | 318/471 |

FOREIGN PATENT DOCUMENTS

| | | |
|---|---|---|
| DE | 43 22 765 | 6/1994 |
| DE | 196 20 458 | 11/1996 |
| DE | 195 40 824 | 5/1997 |
| DE | 195 41 575 | 12/1998 |

* cited by examiner

Primary Examiner—Joe Waks
Assistant Examiner—Julio Gonzalez Ramirez
(74) Attorney, Agent, or Firm—Crowell & Moring LLP

(57) ABSTRACT

A method for operating a load dependent current-generating system which supplies at least one electric drive motor with electrical energy. A power request is made to the electric drive motor, and a dynamic parameter of the current generating system and/or a simulation model, which characterizes the behaviour of the current generating system, is used for calculating the setpoint current value for the current generating system.

8 Claims, 2 Drawing Sheets

METHOD FOR GENERATING A SETPOINT CURRENT VALUE FOR A LOAD-DEPENDENT CURRENT-GENERATING SYSTEM

BACKGROUND AND SUMMARY OF THE INVENTION

This application claims the priority of 101 19 726.8, filed Apr. 21, 2001, the disclosure of which is expressly incorporated by reference herein.

The invention relates to an improved method for generating a setpoint current value for a load-dependent current-generating system.

German Patent DE 195 41 575 C2 discloses a method for determining a setpoint current value for a load-dependent current generating system, in particular for a fuel cell system, in an electric vehicle. Setpoint values for the motor winding section currents of the electric drive motor are determined on the basis of the accelerator pedal position. The power setpoint value for the current-generating system is generated from the setpoint values for the motor winding section currents of the electric drive motor.

The present invention is therefore based on the object of improving the dynamic behaviour of the overall system having at least one current generating system and an electric drive motor.

The method is suitable in particular for use in a system in which the dynamics of the current generating system are slower than the dynamics of the drive motor because the method compensates the slow dynamics of the current-generating system. The dynamic behaviour of a system is given in particular by the delays and time constants of this particular system. As a result of taking into account the dynamic behaviour of the current-generating system in the determination of the setpoint current value, these delays and time constants are compensated by the determined setpoint current value which. This leads to a fast, and thus dynamic, behaviour of the overall system with an improved reaction time.

Of course, the features which are mentioned above and which will be explained below can be used not only in the respectively given combination but also in other combinations or alone without departing from the scope of the present invention.

Further features and refinements of the invention emerge from the further claims and the description.

BRIEF DESCRIPTION OF THE DRAWINGS

The invention is described below in more detail with reference to drawings, in which.

DETAILED DESCRIPTION OF THE PREFERRED EMBODIMENT

Figure 1:
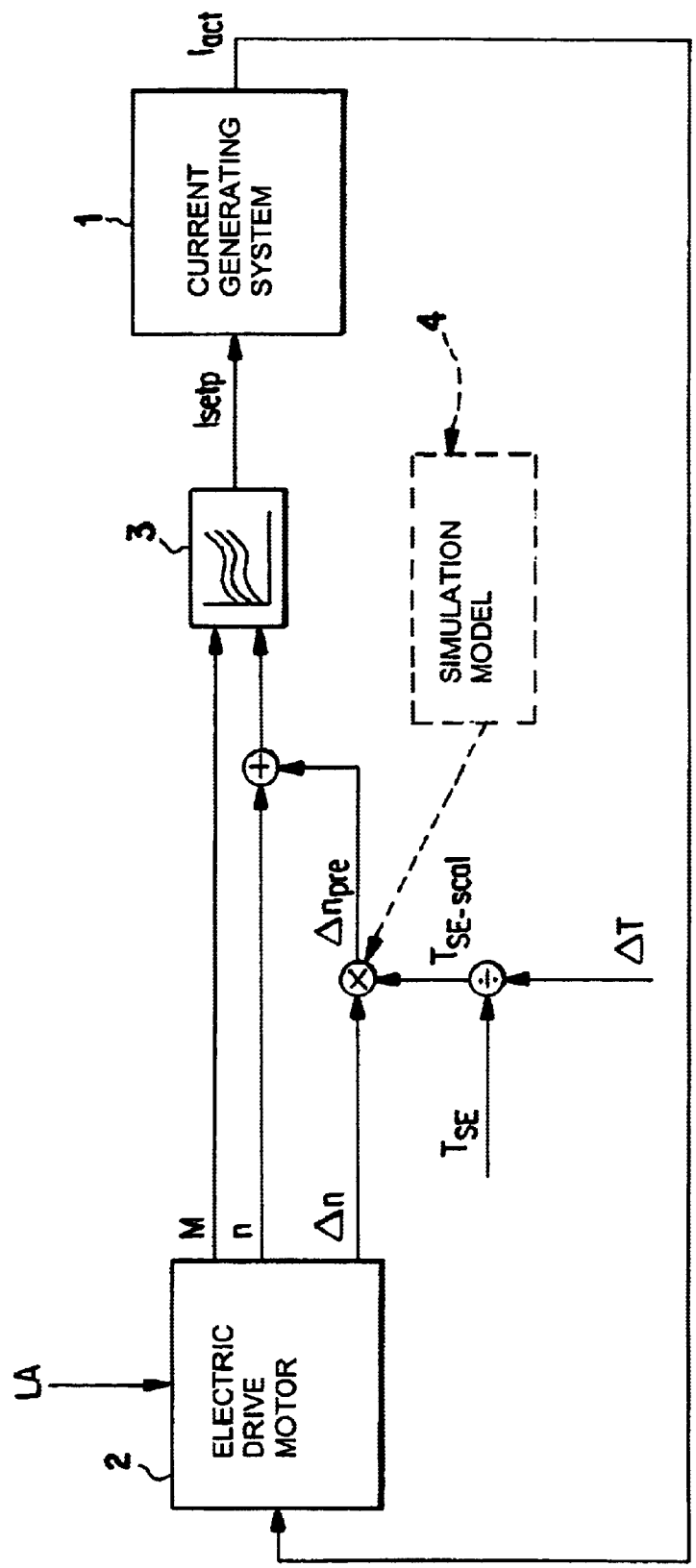
FIG. 1 shows a block circuit diagram of a method according to the invention for generating a setpoint current value for a load-dependent current-generating system.
Figure 2:
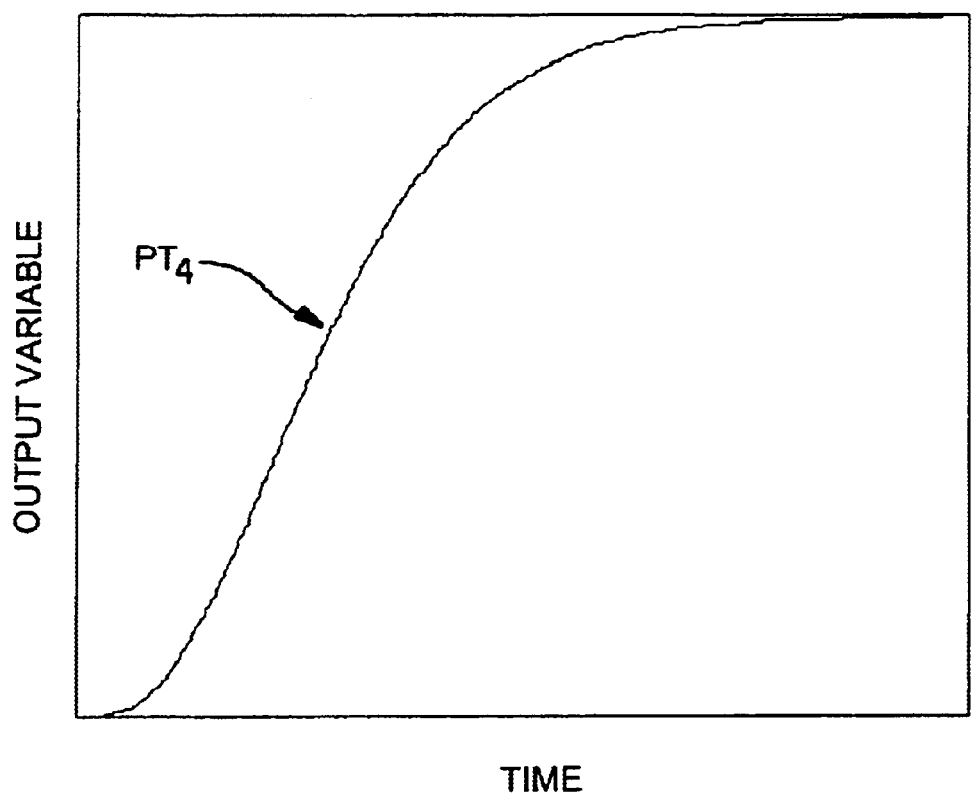
FIG. 2 shows a step response of an exemplary current generating system.

A method according to the invention for generating a setpoint current value for a load-dependent current generating system is described below with reference to FIG. 1. The current-generating system 1 supplies electrical energy to at least one electric drive motor 2 to which a power request LA is made. The current $I_{act}$ generated by the current-generating system 1 is made available to the electric drive motor 2. The current-generating system 1 and the electric drive motor 2 are preferably arranged in a mobile device, in particular a vehicle, and the electric drive motor 2 is used, inter alia, to drive the mobile device. During operation in a mobile device, the power request LA is usually made to the electric drive motor 2 by means of an accelerator pedal request.

The time constant, scaled with the timing clock $\Delta T$, of the current-generating system $T_{SE\text{-}scal}$ is used as dynamic parameter to calculate the setpoint current value $I_{setp}$ for the current-generating system 1. The scaling of the time constant of the current-generating system $T_{SE}$ is preferably carried out by dividing the time constants $T_{SE}$ by the timing clock $\Delta T$. The timing clock $\Delta T$ gives the number of time units after which a measured value of a variable, for example the motor rotational speed n, is taken. The scaling ensures that all the variables used have the same time reference frame.

In addition to, or instead of, the time constant, further dynamic parameters of the current-generating system 1, for example the dead time and/or a mathematical and/or physical simulation model 4 of the current-generating system, can be used for the calculation. A mathematical or physical simulation model 4 can be given, for example, in the form of a differential equation. If, for example, a fuel cell system in which the hydrogen is acquired from reforming methanol is used as the current-generating system 1, a proportional element with fourth-order delay, which is referred to as a $PT_4$ element, is illustrated as an unbroken curve if the input variable is a step function.

In addition, the dynamics of the rotational speed $\Delta n$ of the electric drive motor 2 at a given time are used to calculate the setpoint current value $I_{setp}$ of the current generating system 1. The dynamics of the rotational speed $\Delta n$ of the electric drive motor 2 at a given time are preferably determined by differentiating the rotational speed n of the electric drive motor 2 at a given time.

A predictive rotational speed difference $\Delta n_{pre}$ is determined from the scaled time constant $T_{SE\text{-}scal}$ of the current-generating system 1 and the differentiated rotational speed $\Delta n$ of the electric drive motor 2. The predictive rotational speed difference $\Delta n_{pre}$ thus depends on the dynamic behaviour of the current generating system 1, characterized by $T_{SE\text{-}scal}$. In addition, the predictive rotational speed difference $\Delta n_{pre}$ depends on the angular acceleration, and therefore on the acceleration of the vehicle, in particular when employed in electric vehicles which use gearboxes with a fixed transmission ratio.

Furthermore, in order to calculate the setpoint current value $I_{setp}$ of the current-generating system 1, a rotational speed n of the electric drive motor 2 at a given time and a torque M of the electric drive motor 2 are used. The current torque and/or the setpoint torque of the electric drive motor 2 can be used as torque M. The setpoint current value $I_{setp}$ for the current-generating system 1 is preferably determined, by means of a characteristic diagram 3, from the torque M of the electric drive motor 2 and from the sum of the rotational speed n of the electric drive motor 2 at a given time and the predictive rotational speed difference $\Delta n_{pre}$. The torque M and the sum of the rotational speed n at a given time and of the predictive rotational speed difference $\Delta n_{pre}$ form the input variables of the characteristic diagram 3. The output variable of the characteristic diagram is the setpoint current value $I_{setp}$. The setpoint current value $I_{setp}$ which is determined takes into account the dynamics of the current-generating system 1. It also takes into account the acceleration of the vehicle in particular when employed in electrical vehicles which use gearboxes with a fixed transmission ratio.

The method or the algorithm for the method is preferably integrated in a first control unit (not illustrated). The motor variables of the rotational speed n at a given time and the torque M of the electric drive motor may be directly measured values or be made available to the first control unit by a second control unit (not illustrated).

The method is preferably applied in a current generating system 1 whose dynamics are slower than the dynamics of the electric drive motor 2 which is used. This is the case, for example, if a fuel cell system is used as current-generating system 1 in a vehicle. When there is a setpoint value step, an electric vehicle drive motor 2 has typically reached approximately 90 per cent of the setpoint value after several tens of milliseconds. On the other hand, fuel cell systems which are supplied directly with hydrogen usually have a slower dynamic behaviour. Fuel cell systems in which a liquid fuel, for example methanol or petrol, is firstly reformed and then the hydrogen which is generated is fed to the fuel cell system react even more slowly. When there is a high degree of acceleration of the overall system, the fuel cell system must make available quickly changing current values. However, depending on the fuel cell system, this is possible only to a restricted degree owing to the limited dynamics of the fuel cell system. The consequences are under supply of power to the electric drive motor, voltage dips and possibly switching off of the fuel cell system.

By using the method according to the invention, the setpoint current value $I_{setp}$ is operator-controlled in such a way that the dynamics of the fuel cell system are compensated. This leads to an improvement in the acceleration values of the overall system, for example of a vehicle, and to a more precise current balance. The method according to the invention is therefore suitable in particular for use with rapidly changing working points, for example when a vehicle accelerates when travelling downhill, when a traction control system responds and there is the associated rapidly changing power request LA to the electric drive motor 2. In addition, the predictive calculation of the setpoint current value Isetp optimizes consumption. In fuel cell systems in which the hydrogen is acquired by reforming a liquid fuel, for example methanol or petrol, the production of hydrogen can thus also be optimized.

A further advantage of the method according to the invention is its low degree of complexity which permits simple implementation of the method in a control unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a setpoint current value for a load-dependent current-generating system which supplies an electric drive motor with electrical energy, said method comprising the steps of:

providing a power request (LA) to the electric drive motor;

providing at least one of a dynamic parameter of the current-generating system and a simulation model which characterizes behavior of the current-generating system; and calculating a setpoint current value ($I_{setp}$) as a function of said at least one of said dynamic parameter of the current generating system and said simulation model wherein a rotational speed (n) of the electric drive motor at a given time and a torque (M) of the electric drive motor are additionally used for calculating the setpoint current value ($I_{setp}$) of the current-generating system wherein the setpoint current value ($I_{setp}$) for the current generating system is determined from the torque (M) of the electric drive motor and from the sum of the rotational speed (n) of the electric drive motor at a given time and a predictive rotational speed difference ($\Delta n_{pre}$).

2. The method according to claim 1, wherein dynamics of the rotational speed ($\Delta n$) of the electric drive motor at a given time are additionally used for calculating the setpoint current value ($I_{setp}$) of the current-generating system.

3. The method according to claim 1, wherein a time constant, scaled with a timing clock ($\Delta T$), of the current-generating system ($T_{SE-scal}$) is used as a dynamic parameter.

4. The method according to claim 1, the predictive rotational speed difference ($\Delta n_{pre}$) is generated from said at least the dynamic parameter and the simulation model of the current-generating system and from the dynamics of the rotational speed ($\Delta n$) of the electric drive motor at a given time.

5. The method according to claim 1, wherein the predictive rotational speed difference ($\Delta n_{pre}$) is generated from the dynamic parameter of the current generating system and the dynamics of the rotational speed ($\Delta n$) of the electric drive motor at a given time by means of multiplication.

6. The method according to claim 1, wherein one of instantaneous torque at a given time or a setpoint torque of the electric drive motor is used as torque (M).

7. The method according to claim 1, wherein the current-generating system is a fuel cell system.

8. A method for generating a setpoint current value for a load-dependent current-generating system which supplies an electric drive motor with electrical energy, said method comprising the steps of:

providing a power request (LA) to the electric drive motor;

providing at least one of a dynamic parameter of the current-generating system and a simulation model which characterizes behavior of the current-generating system; and calculating a setpoint current value ($L_{setp}$) as a function of said at least one of said dynamic parameter of the current generating system and said simulation model wherein dynamics of the rotational speed ($\Delta n$) of the electric drive motor at a given time are additionally used for calculating the setpoint current value ($I_{setp}$) of the current-generating system wherein the dynamics of the rotational speed ($\Delta n$) of the electric drive motor at a given time are determined by the differentiation of the rotational speed (n) of the electric drive motor at said given time.

\* \* \* \* \*